United States Patent
Pasko et al.

(10) Patent No.: US 8,935,408 B2
(45) Date of Patent: Jan. 13, 2015

(54) PERSONAL AREA NETWORK OF DEVICES AND APPLICATIONS

(75) Inventors: Douglas M. Pasko, Bridgewater, NJ (US); David E. McDysan, Great Falls, VA (US); Stevan H. Leiden, Norwood, MA (US); Daniel J. O'Callaghan, Fairfax Station, VA (US); John Edward Rathke, Southborough, MA (US); Naseem A. Khan, Oak Hill, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 473 days.

(21) Appl. No.: 13/292,619

(22) Filed: Nov. 9, 2011

(65) Prior Publication Data

US 2013/0117385 A1    May 9, 2013

(51) Int. Cl.
```
G06F 15/16      (2006.01)
H04N 21/414     (2011.01)
H04N 21/4227    (2011.01)
H04N 21/475     (2011.01)
H04L 29/08      (2006.01)
H04W 4/00       (2009.01)
H04W 8/18       (2009.01)
```
(52) U.S. Cl.
CPC ..... *H04N 21/41407* (2013.01); *H04N 21/4227* (2013.01); *H04N 21/4751* (2013.01); *H04N 21/4755* (2013.01); *H04L 67/306* (2013.01); *H04W 4/001* (2013.01); *H04L 67/28* (2013.01); *H04W 8/18* (2013.01)

USPC ............................ 709/227; 709/217; 709/232

(58) Field of Classification Search
CPC .................... H04N 21/41407; H04N 21/4227; H04N 21/4751; H04N 21/4755; H04L 67/28; H04L 67/306; H04W 4/001; H04W 8/18
USPC .................................. 709/217, 227–229, 232
See application file for complete search history.

(56) References Cited

U.S. PATENT DOCUMENTS

| | | | |
|---|---|---|---|
| 2005/0165684 A1* | 7/2005 | Jensen et al. ..................... 705/44 |
| 2012/0102050 A1* | 4/2012 | Button et al. ..................... 707/749 |
| 2012/0124176 A1* | 5/2012 | Curtis et al. .................. 709/219 |
| 2012/0159531 A1 | 6/2012 | O'Callaghan |
| 2012/0209907 A1* | 8/2012 | Andrews et al. .............. 709/204 |
| 2012/0215643 A1* | 8/2012 | Nuzzi ........................ 705/14.66 |
| 2013/0044128 A1* | 2/2013 | Liu et al. ........................ 345/633 |
| 2013/0067081 A1* | 3/2013 | Liu et al. ........................ 709/225 |

* cited by examiner

*Primary Examiner* — Phuoc Nguyen

(57) ABSTRACT

A device receives, by using a first communication technique, a message from a first user device. The device identifies a profile associated with the first user device or a user of the first user device. The device further identifies, in the profile, a relevant rule, based on the message, and a second user device that is designated as a primary user device of the user associated with the profile. By using a second communication technique, the device transmits a request for instructions to the second user device based on the relevant rule, and receives the instructions from the second user device. The instructions specify a third user device selected by the user. The device generates a command based on the relevant rule. The device transmits, by using a third communication technique, the command to the third user device.

20 Claims, 5 Drawing Sheets

PERSONAL AREA NETWORK OF DEVICES AND APPLICATIONS

BACKGROUND

Users are increasingly acquiring and/or using a wide variety of devices (e.g., mobile telephone devices, smart phones, personal computers, tablets, televisions (TVs), stereos, video cameras, remote controls, etc.) that are produced by different manufacturers. The devices, often, use different formats and/or communication techniques (e.g., Bluetooth standard) to communicate with other devices. As a result, two or more of the devices often cannot communicate with one another. Accordingly, the user cannot configure a first device to prompt an action of a second device when the first device and the second device are unable to communicate with one another.

A user can, often, operate various devices with a single universal remote control. However, the universal remote control can be used to operate only particular types of devices (e.g., a TV, a set-top box, and a DVD player) that are compatible with the universal remote control (e.g., only devices that receive Infrared signals or Bluetooth signals). Furthermore, the user always has to possess the universal remote control and be within a particular range of controlled devices to operate the controlled devices with the universal remote control. For example, the user may not be able to use a device that is not the universal remote control to prompt the action of another device.

DETAILED DESCRIPTION OF PREFERRED EMBODIMENTS

Figure 1:
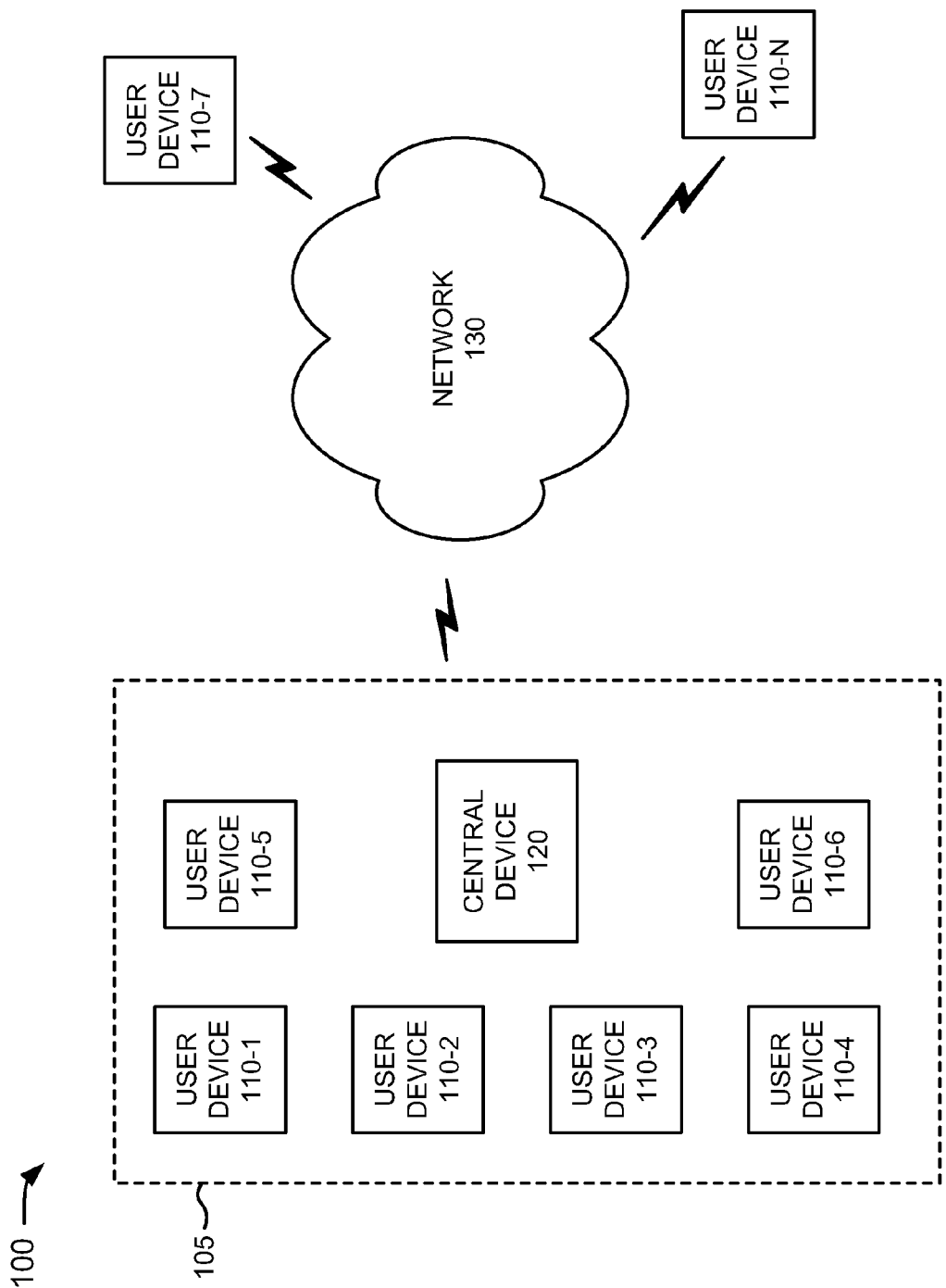
FIG. 1 is a diagram of an example environment in which systems and/or methods described herein may be implemented.

The following detailed description refers to the accompanying drawings. The same reference numbers in different drawings may identify the same or similar elements.

A communication technique may refer to one or more standards and/or mechanisms for exchanging data between devices. In one example, a communication technique may include exchanging data via the Internet and/or an Intranet. In another example, a communication technique may include exchanging data over a relatively short distance by using the Bluetooth standard and/or another radio frequency (RF) protocol, using infrared (IR) signals, using a WiFi mechanism, communicating via a protocol of a set-top box, etc. In yet another example, a communication technique may be based one or more mobile telecommunication standards, such as the third generation (3G) standard, the fourth generation (4G) standard, etc. In still yet another example, a communication technique may include any other type of technique that allows one device to transmit data to another device.

A profile may refer to one or more data structures that store information associated with a user device and/or a user. Each user and/or each user device may have an individual corresponding profile. Herein, a profile may refer to a profile of a user and/or a different profile of the user device.

According to an implementation described herein, a central device may manage interactions between two more user devices by using two or more different communication techniques. For example, a central device may receive, by using a first communication technique, a message from a first user device of a user. The message may indicate, for example, that the first user device is playing audio content. The central device may identify, in a profile associated with the user or the first user device, one or more relevant rules based on the message. Based on one of the relevant rules, the central device may transmit, by using a second communication technique and to a primary device of the user, a request for the user to select a second user device to output the audio content being played by the first user device. Further based on the one of the relevant rules and the selection of the second user device, the central device may transmit, by using a third communication technique, a command to the second user device. The command may direct the second user device to output the audio content. The first communication technique, the second communication technique, and/or the third communication technique may be different from one another. The central device may also transmit one or more other requests and one or more other commands based on other rules of the one or more rules.

As a result, user devices that use different communication techniques are able to communicate with one another via a central device. Specifically, for example, a user may use one user device to prompt, via the central device, an action of another user device. In other implementations, two or more user devices may able to use the same communication technique(s) to communicate directly with one another, and may not need to communicate via the central device. Accordingly, an action of one device may directly prompt an action of another device via direct message(s) between the devices.

FIG. 1 is a diagram of an example environment 100 in which systems and/or methods described herein may be implemented. As shown in FIG. 1, environment 100 may include one or more of the following components: user devices 110-1, 110-2, . . . , 110-N (where N≥1) (collectively referred to as "user devices 110" and individually as "user device 110"); a central device 120; and a network 130. Eight user devices, one central device, and one network have been illustrated in FIG. 1 as an example. In practice, environment 100 may include additional components, fewer components, different components, or differently arranged components than are shown in FIG. 1.

In some implementations, one or more of the components of environment 100 may perform one or more functions described as being performed by another one or more of the components of environment 100. For example, one of user devices 110 may perform functions of central device 120.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with central device 120. In one implementation, user device 110 may include/take the form of an input device. The input device may receive one or more types of data, including audio content, video content, audio and video content, signals, key presses, hand/finger motions, gestures, etc. The input device may include, for example, a set-top box, a microphone, a content recording device (e.g., an audio recorder, a still camera, a video camera, a digital video recorder, etc.), a motion detector, a fingerprint scanner, etc.

In another implementation, user device 110 may include/take the form of a controller device. The controller device may include any device that allows the user to provide commands, requests, instructions, and/or other types of information. The controller device may include, for example, a remote control; a computer with a keyboard and/or other input devices; a mobile phone device with a touch-screen, a keyboard or keypad, and/or a microphone; a dedicated touch-screen tablet associated with central device 120; a touch-screen tablet that communicates with central device 120; etc.

In yet another implementation, user device 110 may include/take the form of an output device. The output device may output audio content, video content, images, text, multimedia displays, and/or other information. The output device may represent an entertainment device. The output device may include, for example, a mobile phone device or a computer with a display screen and/or a speaker, a television, stereo system, etc.

In still yet another implementation, as suggested above, user device 110 may include two or more of an input device, a controller device, and/or an output device. For example, a mobile phone device may include a camera and/or a microphone that allows the mobile phone device to input video data and/or audio data; a keyboard, keypad, or touch screen that allows the user to enter information into the mobile phone device, and a screen and a speaker to output (e.g., display) image data, video data, and/or audio data. Other examples of user devices 110 include a smart phone, a personal digital assistant (PDA), a personal media player, a web service terminal, a personal computer, a tablet computer, a laptop computer, a gaming system, a global positioning system (GPS) device, etc. Each one of the aforementioned user devices 110 may function as an input device, a controller device, and/or an output device.

In still other implementations, user device 110 may include one or more components of a data center environment that are provided by different vendors. For example, user device 110 may include a top of rack (TOR) switch and/or a processor device of a processor rack and/or a storage rack.

As shown in FIG. 1, user devices 110, which execute applications in a personal area network, may be located inside or outside of a residence 105. Residence 105 may represent a dwelling of a user associated with user devices 110, a location of a business associated with the user, one or more data centers, multiple locations of an organization (e.g., where one or more of the multiple locations are virtualized within a data center), and/or any other location(s) and/or network(s) (e.g., a local area network (LAN)) associated with, and/or defined by, the user. In another example, user devices 110 may be located inside or outside of multiple locations and/or networks associated with, and/or defined by, the user.

In one implementation, a user of user devices 110 may designate one of user devices 110 as a primary user device 110. For example, the user may designate user device 110-5 as the primary user device 110 because user device 110-5 is a mobile phone device that is usually accessible by the user at all times. In this example implementation, central device 120 may only transmit requests for additional information/instructions to the primary user device 110. The user may use the primary user device 110 and/or another user device to register for a management service provided by central device 120, as described further below with reference to FIG. 3.

In another implementation, a user of user devices 110 may designate, and/or central device 120 may select, two or more of user devices 110 as primary user devices 110. In this example implementation, central device 120 may transmit a request for additional information/instructions to one or more of the primary user devices 110 based on a type of the request and/or one or more other conditions. In one example, central device 120 may transmit a particular request to user device 110-5 when user device 110-5 is located outside of residence 105. When user device 110-5 is located inside of residence 105, central device 120 may transmit the particular request to another user device 110 (e.g., user device 110-4, which is, for example, a system that includes a television and/or a set-top box). In another example, central device 120 may transmit one type of request to a particular user device 110 (e.g., user device 110-1, which is, for example, a laptop computer) when the request is associated with social networking. In response to the request, the particular user device 110 may automatically, for example, identify content that the user is watching and/or hearing. Central device 120 may transmit another type of request to other user devices 110 (e.g., user device 110-2 and/or user device 110-5) when the request is associated with playing a media file within residence 105.

Central device 120 may include one or more server devices, or other types of computation or communication devices, that gather, process, and/or provide information in a manner described herein. In one example, central device 120 may include a single server device or a collection of multiple server devices and/or computer systems that are capable of communicating with user devices 110. In another example, one of user devices 110 may include central device 120. In one implementation, as shown in FIG. 1, central device 120 may be located within residence 105 of a user of user devices 110. In another implementation, central device 120 may be located outside of residence 105. For example, one or more devices connected to, or within, network 130 may include central device 120. In yet another implementation, central device 120 may include multiple devices, including one or more devices that are within residence 105 and/or one or more devices that are outside of residence 105. When central device 120 includes multiple devices, each one of the multiple devices may only implement/perform particular/limited functions of central device 120.

Central device 120 may handle a registration to manage user devices 110 of a user. After the registration, central device 120 may store a profile for the user. The profile may include one or more rules for different scenarios that involve one or more user devices 110 of the user. For example, one of the rules may allow the user to select one of user devices 110 to act as an output device when another user device 110 is playing a media file within residence 105.

Central device 120 may handle interactions between user devices 110 when one or more of the rules are satisfied. For example, central device 120 may receive a message from a user device 110 (e.g., user device 110-2). The message may indicate, for example, that user device 110-2 is playing a media file within residence 105. Central device 120 may determine that one of the rules is satisfied based on the message. In response, central device 120 may transmit a request, to a primary user device 110 of the user, for the user to select another one of user devices 110 as an output device to output audio content and/or video content associated with the media file. For example, the user may select another user device 110 (e.g., user device 110-3) as the output device. Central device 120 may transmit a command to user device 110-3 to output the audio content and/or the video content. In one implementation, the command may include the audio content and/or the video content of the media file. In another implementation, central device 120 may receive the audio content and/or the video content from user device 110-2, and may relay/forward the received audio content and/or the received video content to user device 110-3.

Network 130 may include a single network, multiple networks of a same type, or multiple networks of different types. For example, network 150 may include one or more of a direct connection between devices, a local area network (LAN), a wide area network (WAN) (e.g., the Internet), a metropolitan area network (MAN), a wireless network (e.g., a general packet radio service (GPRS) network, a WiFi network, a wireless LAN (WLAN), etc.), a telephone network (e.g., a Public Switched Telephone Network (PSTN) or a cellular network), a subset of the Internet, an ad hoc network, a fiber optic network (e.g., a fiber optic service (FiOS) network), a Virtual Private Network (VPN), or any combination of the aforementioned networks.

Figure 2:
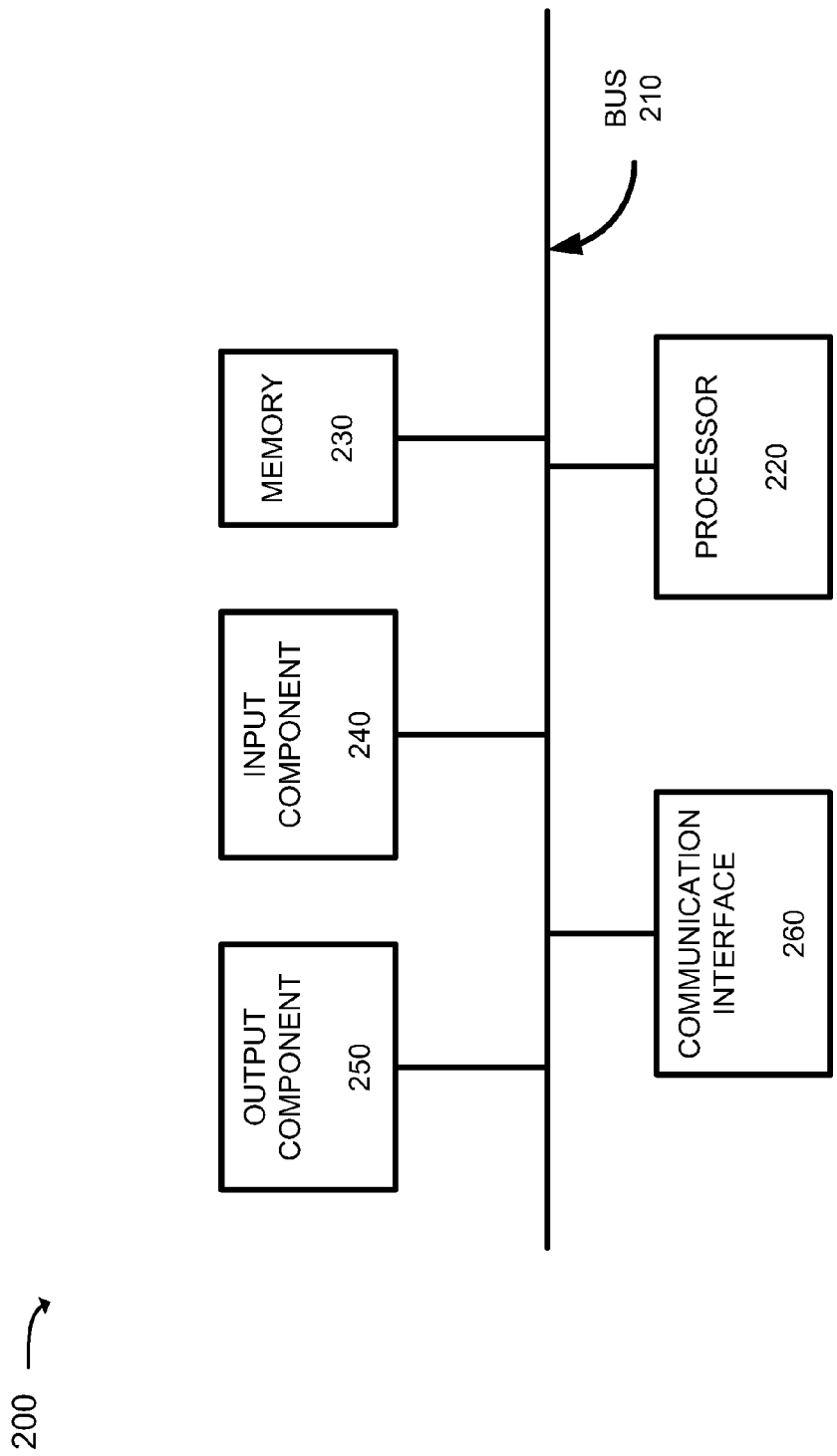
FIG. 2 is a diagram of example components of one or more of the devices of FIG. 1.

FIG. 2 is a diagram of example components of devices 200 that may correspond to user device 110 and/or central device 120. Each one of user device 110 or central device 120 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. For example, device 200 that corresponds to central device 120 may include multiple communication interfaces 260 that are used for different types of communication techniques. Additionally, or alternatively, one or more components of device 200 may perform one or more tasks described as being performed by one or more other components of device 200.

Bus 210 may include a path, or a collection of paths, that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons; a touch screen interface to permit data and control commands to be input into device 200, a speaker to receive electrical signals and output audio signals, a microphone to receive audio signals and output electrical signals, a display to output visual information (e.g., web pages, product information, video content, call information, etc.), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
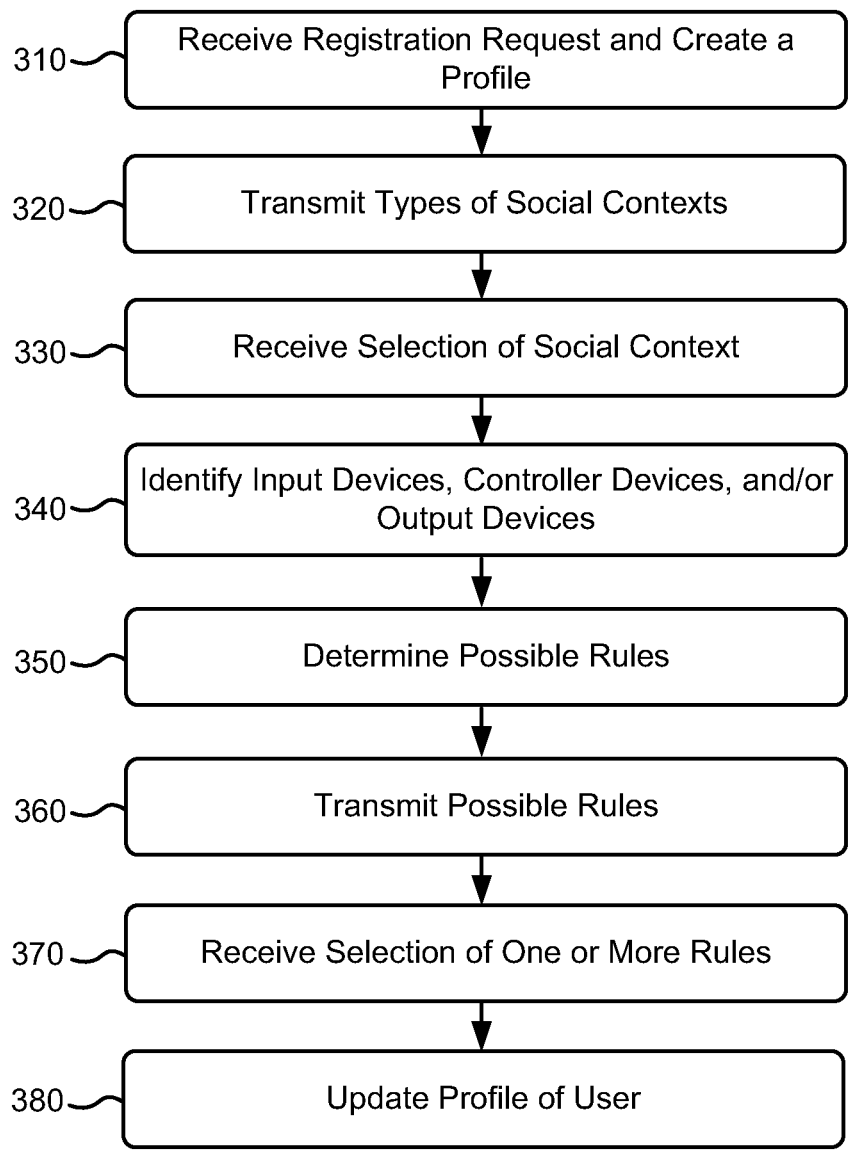
FIG. 3 is a flow chart of an example process for creating and/or updating a profile.

FIG. 3 is a flow chart of an example process 300 for creating and/or updating a profile. In one implementation, central device 120 may perform process 300. In another implementation, a device or collection of devices separate from, or in combination with, central device 120 may perform some or all of process 300.

As shown in FIG. 3, process 300 may include receiving a registration request and creating a profile (block 310). In one implementation, a user may decide to register for a service to allow central device 120 to manage user devices 110 (e.g., manage interactions between user devices 110) associated with the user. To register, the user may use one of user devices 110, or another type of device, to access a portal associated with central device 120. The portal may prompt the user to enter information associated with the user (e.g., a name, a phone number, a username, a password, etc.), residence 105 of the user or enterprise (e.g., an address, geographic boundaries, etc.), and/or a LAN associated with the user and/or residence 105 (e.g., a name of the LAN).

In another implementation, the information associated with the user may further include information associated with social networking accounts of the user. The user may enter the information by using one of user devices 110 and/or another type of device. Central device 120 may receive the entered information as part of a registration process for the user. In some implementations, the user may also designate, and/or central device 120 may identify, one of user devices 110 as a primary user device 110 of the user. Central device 110 may create a profile for the user based on the information obtained during the registration process. The profile may include the information entered by the user and/or information about the designated primary user device 110.

Process 300 may further include transmitting types of social contexts (block 320) and receiving a selection of social context(s) (block 330). For example, after central device 120 completes the registration process and/or after the primary user device 110 is designated/identified, central device 120 may transmit different types of social contexts to the primary user device 110. A type of a social context may specify characteristics associated with the user, other users of user devices 110, and/or residence 105. The types of social contexts may be represented by various phrases including, for example, "a family," "children under the age of 12," "only adult residents," "senior citizens," "a small business," "a retail establishment," "a professional office," "shared devices," "social networking users," one or more names of organization in an enterprise, one or more names of particular individuals, etc. The user may select one or more of the phrases. The primary user device 110 may transmit, to central device 120, a selection of one or more social contexts that correspond to the selected phrases. Central device 120 may receive the selection of the social contexts. Central device 120 may specify the selection of the social contexts in the profile of the user. Central device 120 may use the social contexts to, for example, provide possible rules to the user, as described further below.

Process 300 may also include identifying input devices, controller devices, and/or output devices (block 340). In one implementation, the user may use the portal, associated with central device 120, to provide information about one or more user devices 110. The user may identify each user device 110 as an input device, a controller device, and/or an output device. The information about user device 110 may include identifying information that central device 120 can use to identify a device, capabilities information that specifies capabilities of user device 110, settings information that specify settings (e.g., volume level, contrast level of screen, etc.) of user device 110, access information that specifies which other users can access, operate, and/or control user device 110, etc. Central device 120 may identify user device 110 based on the information provided by the user.

Additionally, or alternatively, central device 120 may automatically discover one or more user devices 110. For example, central device 120 may recognize a Bluetooth signal, a Wi-Fi signal, a 3G signal, a 4G signal, and/or any other type of signal from user device 110. Central device 120 may determine information associated with user device 110 based on the signal. The information may include, for example, a type of user device 110, a model of user device 110, identifying information that central device 120 can use to identify user device 110 at a later point in time, capabilities information that specifies capabilities of user device 110, etc. Central device 110 may identify user device 110 as an input device, a controller device, and/or an output device based on the determined information.

Additionally, or alternatively, central device 120 may automatically discover a particular user device 110 based on a signal from the particular user device 110 within residence 105. In response, central device 120 may transmit a request to the particular user device 110 and/or to a primary user device 110 associated with residence 105. The request may inquire whether the user wants to identify the particular user device 110 as an input device, a controller device, and/or an output device. The user may further provide additional information about the particular user device 110, as discussed above. Central device 110 may identify one or more user device 110 as input devices, controller devices, and/or output devices by using one or more of the aforementioned implementations.

Process 300 may also include determining possible rules (block 350). For example, central device 120 may store and/or have access to different rules for different scenarios. Each one of the rules may specify an action to be performed by central device 120 in response to a message received from user device 110. For example, a rule may specify that when a particular user device 110 or a particular type of user device 110 (e.g., a mobile phone device) receives information (e.g., text entered by the user), central device 120 is to share the information with one or more other user devices 110 (e.g., a personal computer of the user).

Additionally, or alternatively, a rule may specify that when a particular user device 110 (e.g., a computer connected to a video camera) detects that a person, a particular type of person (e.g., a child), or a particular person (e.g., John Smith) are/is inside of residence 105, central device 120 is to transmit a message to another particular user device 110 (e.g., a mobile phone device) and/or disable yet another particular user device 110 (e.g., a motion detector). This rule may further specify that the message should indicate that a person, a particular type of person, or a particular person are/is inside of residence 105. The particular user device 110 and/or central device 120 may recognize a person, a particular type of person, or a particular person by using voice and/or facial recognition.

Additionally, or alternatively, a rule may specify that when a particular user device 110 is outside of residence 105, central device 120 is to share a GPS location of the particular user device 110 with one or more other user devices 110, and/or central device 120, is to post information about the GPS location to one or more social networking accounts of the user. Additionally, or alternatively, a rule may specify that when a particular user device 110 (e.g., a personal media player) is playing a file (e.g., a file that includes audio content and/or video content), central device 120 is to allow the user to select another user device 110 (e.g., a stereo system and/or a display device) to output content in the file and central device 120 is to transmit a command to the selected user device 110 to output the content.

Additionally, or alternatively, a rule may specify that when a particular user device 110 (e.g., a personal media player) is playing a particular type of content (e.g., audio content), central device 120 is to log/store information associated with the content, post the information to one or more social networking accounts of the user, and/or transmit the information to one or more accounts of people who are related to the user via the one or more social networking account. The user may use another user device 110 to retrieve, from central device 120, the information associated with the content at a later point in time. The information associated with the content may include the content, a type of the content, an identifier (e.g., a name) of the content, and/or a GPS location of the particular user device 110 when the particular user device 110 played the content.

Additionally, or alternatively, a rule may specify that when a particular user device 110 receives an image or a video of a person during a particular time period (e.g., 11:00 PM-7:00 AM), central device 120 is to forward the image or the video to another device or to a third party (e.g., a security monitoring company). Additionally, or alternatively, a rule may specify that only the primary user device 110 is to receive information, requests, and/or commands from central device 120 when the primary user device 110 is within a particular distance from central device 120 and/or residence 105 or when the primary user device 110 is within a particular predefined geographic area (e.g., residence 105, an area outside of a place of business of the user, etc.).

Additionally, or alternatively, a rule may specify that when one of user devices 110 is used to dial a particular phone number (e.g., 911), central device 120 is to allow a third party (e.g., an emergency service provider) to operate the user device 110 (e.g., a microphone, a video camera, etc.) and/or receive content received by one or more other user devices 110 via central device 120. In other implementations, central device 120 may transmit a request to the user device 110 and/or a primary user device 110 for the user to provide permission to allow the third party to operate one or more user devices 110 and/or receive the content. Generally, the rules may specify an action to be taken by a user device 110 or central device 120 in response to the occurrence of a particular condition or event.

Central device 120 may determine one or more possible rules that can be selected by the user based on the social contexts selected by the user and/or information associated with the identified user devices 110 (e.g., types of the identified user devices 110). For example, central device 120 may select a particular quantity of all available rules as the possible rules. The selected possible rules may be categorized (e.g., stored) in association with the social contexts and/or the types of the identified user devices 110 and update the user's profile based on the selection.

Returning to FIG. 3, process 300 may also include transmitting possible rules (block 360), receiving a selection of one or more of the rules (block 370), and updating a profile of the user (block 380). For example, central device 120 may transmit the possible rules to the primary user device 110. The user may use the primary user device 110 to select one or more of the possible rules. The primary user device 110 may transmit the selection of one or more of the possible rules to central device 120. Central device 120 may receive the selection of one or more of the possible rules.

Additionally, or alternatively, the user may use the primary user device 120 to define/create one or more new rules associated with one or more of the identified user devices 110. Central device 120 may receive the newly defined rules from the primary user device 120. Central device 120 may update the profile of the user to include the selected rules and/or the newly defined rules in the profile.

Figure 4:
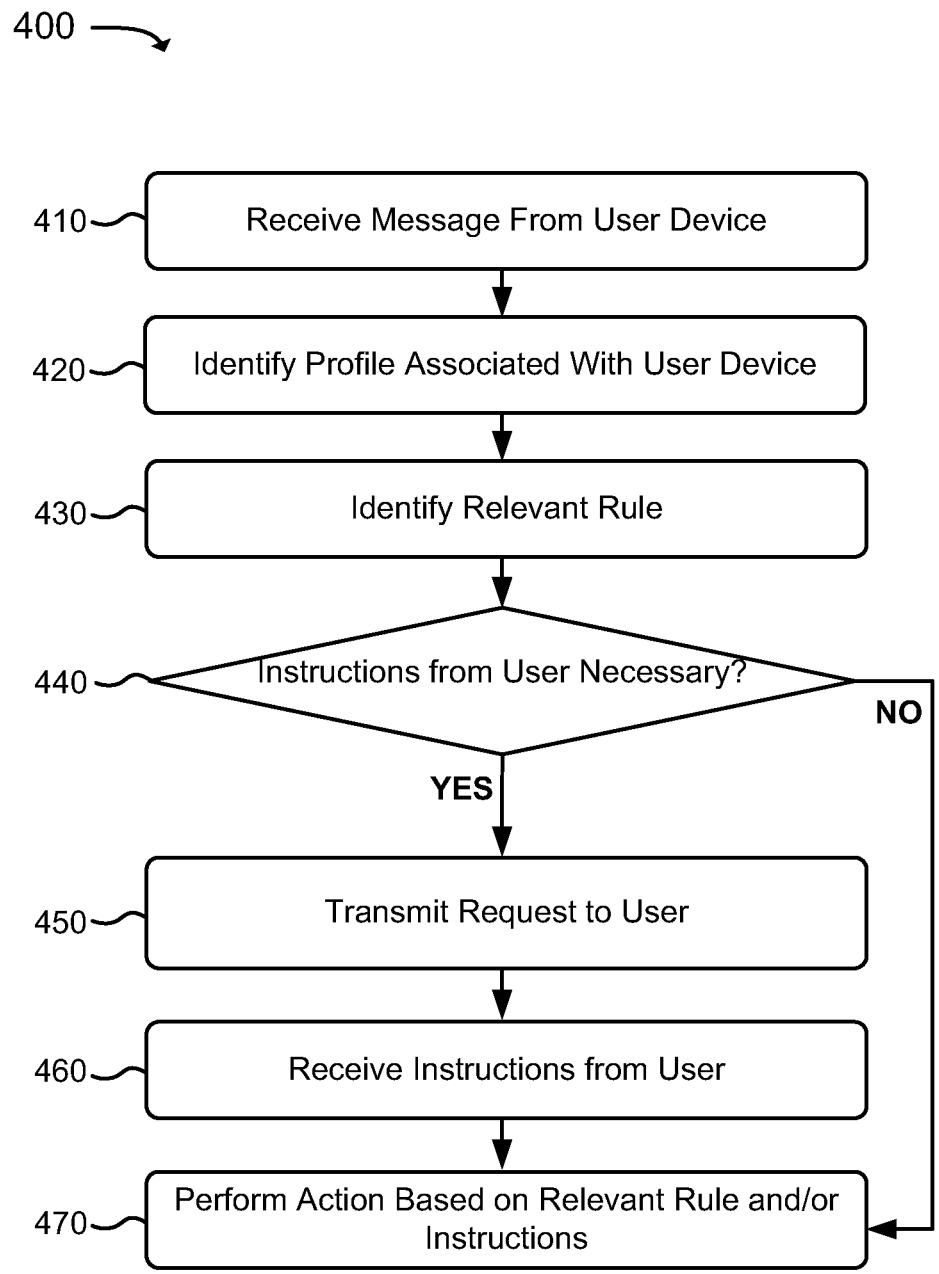
FIG. 4 is a flow chart of an example process for centrally managing user devices.

FIG. 4 is a flow chart of an example process 400 for centrally managing user devices. In one implementation, central device 120 may perform process 400. In another implementation, a device or collection of devices separate from, or in combination with, central device 120 may perform some or all of process 400.

As shown in FIG. 4, process 400 may include receiving a message from a user device (block 410). In one implementation, a user may prompt, for example, user device 110-1 to perform a particular action (e.g., play a media file). In response to the particular action, user device 110-1 may generate a message that includes information about the particular action (e.g., the playing of the media file). In another implementation, user device 110-1 may automatically generate the message on a periodic basis (e.g., every 2 hours) and/or when a particular condition is met. The condition may be met when, for example, user device 110-1 is outside of residence 105 or within a predefined geographic areas or when it is raining at a location of user device 110-1 (e.g., based on weather information, received from a weather web service, for the location). The message may include a state of user device 110-1 (e.g., a geographic location of user device 110-1, a weather condition associated with the geographic location, an action being performed by user device 110-1, etc.).

The message may have a first type of format that is not used and/or not understood by all other user devices 110. User device 110-1 may transmit the message to central device 120 by using a first type of communication technique. The first type of communication technique may include, for example, transmitting the message via the Internet and/or an Intranet, using the Bluetooth standard or another radio frequency (RF) protocol, using infrared (IR) signals, using Wi-Fi, using the 3G standard, using the fourth generation (4G) standard, and/or using any other type of technique used for transmitting data from one device to another device. Central device 120 may receive/intercept the message transmitted via the first type of communication technique.

Process 400 may further include identifying a profile associated with the user device (block 420) and identifying a relevant rule in the profile (block 430). For example, the message may include an identifier of user device 110-1. Central device 120 may identify a profile that includes the identifier of user device 110-1. The profile may be for the user of user device 110-1. Thereafter, central device 120 may extract data from the message that specifies the particular action or the state of user device 110-1. Central device 120 may identify a relevant rule based on the identifier of user device 110-1, a type of user device 110-1, and/or the extracted data.

Process 400 may also include determining whether instructions from a user are necessary (block 440). For example, assume that user device 110-1 is a personal media player and that the extracted data indicates that user device 110-1 is playing a particular audio file. The relevant rule, identified by central device 120, may be relevant when any personal media player is playing any audio file. The relevant rule may specify that instructions from the user are necessary regarding which other user device 110 should receive information about the audio file being played by the personal media player. Central device 120 may determine whether instructions from the user are necessary based on the relevant rule.

In another implementation, a rule may specify that no personal media player is allowed to play loud music (e.g., above a particular decibel level) during a particular period of time (e.g., between 10:00 P.M.-6:00 A.M.). When central device 120 determines that the rule is relevant due to an action, of playing an audio file, performed by a user using user device 110-1, central device 120 may transmit a message to user device 110-1 and/or another user device 110. The message may prompt user device 110-1 to deny the action of playing of the audio file and/or to display information to notify the user that the user cannot use user device 110-1 to play loud music during the particular period of time.

If instructions from the user are necessary (block 440-YES), process 400 may include transmitting a request to the user (block 450) and receiving instructions from the user (block 460). Further to the example above, after determining that instructions from the user are necessary, central device 120 may identify an applicable primary user device 110, such as user device 110-7 (e.g., a mobile phone device of the user). In one implementation, central device 120 may determine a second type of format that is used by user device 110-7, which may be not used and/or not be understood by all other user devices 110. User device 110-1 may generate, based on the second type of format, a request for the user to provide the instructions. User device 110-1 may transmit the request to user device 110-7.

Based on the request, user device 110-7 may display information regarding one or more user devices 110 that may output audio content based on the audio file being played by personal media player 110-1. The user may use user device 110-7 to select one of the one or more user devices 110, such as user device 110-3 (e.g., a device that includes a loudspeaker). User device 110-7 may generate instructions based on the selection. The instructions may specify for central device 120 to direct user device 110-3 to output the audio content based on the audio file. User device 110-7 may transmit the instructions to central device 120. Central device 120 may receive the instructions.

In another implementation, central device 120 may store previous instructions provided by the user in response to a previous request for the relevant rule. The previous instructions, for example, may have directed central device 120 to direct user device 110-2 (e.g., a personal computer) to output the audio content based on the audio file. The request, transmitted from central device 120 to user device 110-7, may allow the user to re-use the previous instructions or to select another user device 110 to output the audio content based on the audio file. Central device 120 may receive the instructions that instruct central device 120 to use the previous instructions or to direct a newly selected user device 110, such as user device 110-3, to output the audio content based on the audio file.

The request and/or the instructions may have the second type of format, which may not be used and/or not be understood by all other user devices 110 (e.g., including user device 110-1). The second type of format may be different from the first type of format of the message received from user device 110-1. Central device 120 may transmit the request to user device 110-7 by using the second type of communication technique and receive the instructions from user device 110-7 by using the second type of communication technique. The second type of communication technique may be different from the first type of communication technique, and user device 110-1 may not be able to use the second type of communication technique. Central device 120 may also convert data (e.g., a request, instructions, a message, etc.) with the first type of format, used by user device 110-1, into data with the second type of format, used by user device 110-7. Central device 120 may transmit the converted data, now with the second type of format, to user device 110-7.

After receiving instructions from the user (block 460) or if instructions from the user are not necessary (block 440-NO), process 400 may include performing an action based on the relevant rule and/or the instructions (block 470). Further to the example above, after receiving the instructions from user device 110-7, central device 120 may determine a third type of format for a command based on information associated with user device 110-3, which is identified in the received instructions. The determined format that may be a particular data format that may be received and/or processed (e.g., understood) by user device 110-3. Central device 120 may generate the command based on the rule/instructions and/or the determined format. The command may include an identifier associated with the audio content (e.g., which may identify how to obtain the audio content), the audio content, and/or instructions to output the audio based on the audio content. Central device 120 may perform an action, based on the rule, by transmitting the command to user device 110-3, which is identified in the received instructions. User device 110-3 may receive the command from central device 120.

The command may have the third type of format, which may not be used and/or not be understood by all other user devices 110 (e.g., including user device 110-1 and/or user device 110-3). The third type of format may be different from the first type of format and/or the second type of format. Central device 120 may transmit the command to user device 110-3 by using a third type of communication technique. The third type of communication technique may be different from the first type of communication technique and/or the second type of communication technique, and user device 110-1 and/or user device 110-7 may not be able to use the third type of communication technique.

In another example, the relevant rule may indicate that instructions from the user are not necessary. The rule may direct central device 120 to forward information, included in the message received from user device 110-1, to one or more other user devices 110, such as user devices 110-5 and 110-6. To perform the action, central device 120 may place the information in a type of format associated with user device 110-5, and may use a communication technique associated with user device 110-5 to transmit the information to user device 110-5. Central device 120 may further place the information in a type of format associated with user device 110-6, and may use a communication technique associated with user device 110-6 to transmit the information to user device 110-6.

In yet another example, the rule may direct central device 120 to store information, included in the message that was received from user device 110-1. To perform the action, central device 120 may store the information in central device 120 or in a separate/remote device accessible by central device 120. At a later point in time, the user may use a different user device 110, such as user device 110-4 (e.g., a personal computer), to request the information from central device 120. In response, central device 120 may retrieve the information, and may transmit the information to user device 110-4. User device 110-4 may use a communication technique associated with user device 110-4 to communicate with central device 120, which may be different from the first communication technique used by user device 110-1 to provide the message, with the information, to central device 120.

In still yet another example, the rule may direct central device 120 to post information, included in the message received from user device 110-1, to one or more social networking accounts associated with the user. Central device 120 may retrieve identifying information associated with the accounts from the profile of the user. To perform the action, central device 120 may use the identifying information to access the social networking accounts and post the information via the Internet.

Figure 5:
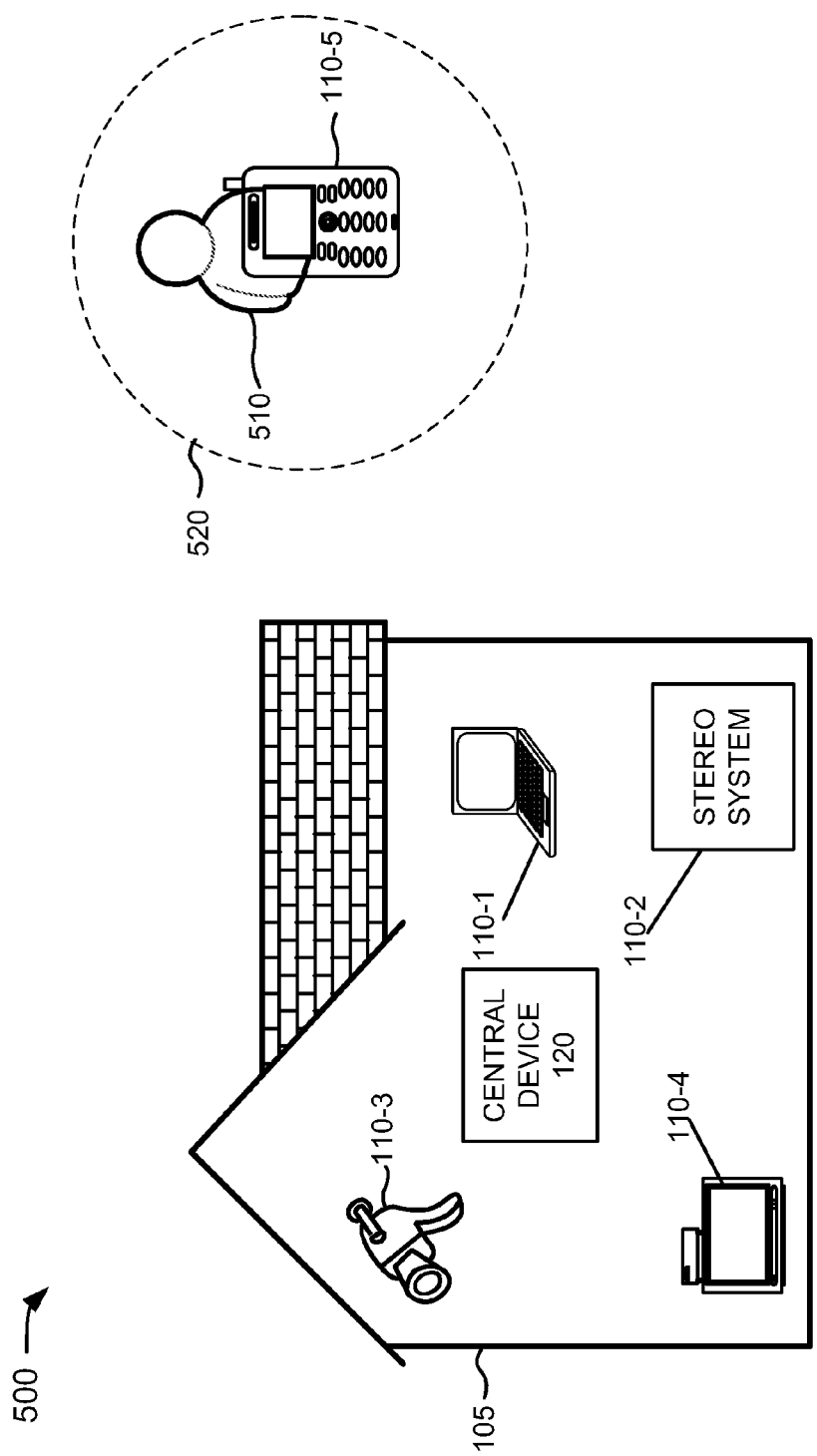
FIG. 5 is a diagram that illustrates an example of centrally managing user devices.

FIG. 5 is a diagram that illustrates an example 500 of centrally managing user devices 110. A user 510 may use user device 110-5 or another user device 110 (e.g., user device 110-1) to register for a service to allow central device 120 to manage interactions between user devices 110. User device 110-5 may use a first type of communication technique (e.g., Bluetooth) to communicate with central device 120.

During the registration process, user 510 may provide information about user 510, residence 105 (e.g., a home of user 510), and user devices 110-1, 110-2, and 110-5. The user, or central device 120, may designate user device 110-5 as a primary user device of user 510. Central device 120 may select "a family home" as a social context associated with residence 105. Central device 120 may create a profile for user 510 and/or residence 105. Central device 120 may retrieve possible rules based on the selected social context and the information associated with user devices 110-1, 110-2, and 110-5. User 510 may select one or more of the possible rules.

Assume that user 510 selects a first rule to allow user 510 to use user device 110-5 to select one of user devices 110-1, 110-2, and 110-5 to output audio content whenever one of user devices 110-1, 110-2, and 110-5 is used to play an audio file. Further assume that user 510 creates a second rule that is not one of the possible rules retrieved by central device 120. The second rule may, for example, specify for user device 110-1 to receive, from central device 120, a particular message when user device 110-5 is within an area 520 during a particular period of time (e.g., 10:00 PM-6:00 AM). Central device 120 may include the first rule and the second rule in the profile of user 510.

Thereafter, central device 120 may automatically recognize user devices 110-3 and 110-4 based on signals from user devices 110-3 and 110-4. Central device 120 may transmit a message to user device 110-5 to inquire whether user 510 wants central device 120 to manage interactions associated with user devices 110-3 and/or 110-4 and one or more other user devices (not shown in FIG. 5). In response, central device 120 may receive, from user device 110-5, a reply that indicates that user 510 wants central device 150 to manage interactions associated with user devices 110-3 and/or 110-4. Central device 120 may retrieve new possible rules based on the selected social context and information associated with user devices 110-1, 110-2, 110-3, 110-4 and 110-5.

Assume that user 510 selects a third rule, from the new possible rules, to allow user 510 to use user device 110-5 to select one of user devices 110-1, 110-4, and 110-5 to output video content being recorded by user device 110-3 during a particular event (e.g., New Year's Eve) or type of event (e.g., when a person is detected by user device 110-3 based on, for example, movement within residence 105 during a particular time period). Further assume that user 510 creates a fourth rule. The fourth rule may, for example, specify for central device 120 to allow user 510 to use user device 110-5 to resolve a conflict when a set-top box of user device 110-4 is used to schedule multiple conflicting recordings. Central device 120 may further include the third rule and the fourth rule in the profile of user 510.

In one example, assume that central device 120 receives a first message from user device 110-1 by using a second type of communication technique (e.g., WiFi). The first message may indicate that user device 110-1 is being used to play an audio file (e.g., an "Example Song"). Central device 120 may identify the profile of user 510 based on the first message. Central device 120 may further determine that the first rule is relevant based on the first message. Based on the first rule, central device 120 may determine that instructions from user 510 are necessary. Central device 120 may transmit, by using the first type of communication technique, a request for the instructions to user device 110-5. In response, central device 120 may receive, by using the first type of communication technique and from user device 110-5, the instructions to use user device 110-2 to output audio content associated with the audio file being played on user device 110-1.

Central device 120 may transmit, by using a third type of communication technique (e.g., communication via an Intranet), a command to user device 110-2 that directs user device 110-2 to output the audio content. Central device 120 may use the second type of communication technique to receive data associated with the audio content from user device 110-1, and may use the third type of communication technique to forward the data to user device 110-2. User device 110-2 may output the audio content based on the received data and the command.

In another example, assume that user 510 proceeds to move to a location within area 520. Assume that central device 120 receives a second message from user device 110-5 by using the first type of communication technique. The second message may include a GPS location of user device 110-5. Central device 120 may determine that the second rule is relevant based on the second message. Based on the second rule, central device 120 may transmit, by using the second type of communication technique, information to user device 110-1 that specifies that user device 110-5 is located within area 520.

In yet another example, assume that movement is detected within residence 105 during a particular time period (e.g., from 8 am to 3 PM while user 510 is at work). Assume that central device 120 receives a third message from user device 110-3, or another user device 110, by using a fourth type of communication technique (e.g., via infrared signals). The third message may indicate that movement is detected within residence 105. Central device 120 may determine that the third rule is relevant based on the third message. Based on the third rule, central device 120 may determine that instructions from user 510 are necessary. Central device 120 may transmit a request for the instructions to user device 110-5 by using the first type of communication technique. In response, central device 120 may receive, by using the first type of communication technique, the instructions to use user device 110-4 to record the video content being output by user device 110-3.

Before or after receiving the instructions, central device 120 may transmit, to user device 110-3, a first command to record video content for a particular period of time (e.g., 2 hours) or while a particular condition is met (e.g., the motion is detected). And after receiving the instructions, central device 120 may transmit, by using a fifth type of communication technique (e.g., via a set-top box associated with user device 110-4), a second command to user device 110-4 that directs user device 110-4 to record the video content. Central device 120 may use the fourth type of communication technique to receive data associated with the video content from user device 110-3, and may use the fifth type of communication technique to forward the data to user device 110-4. User device 110-4 may record the video content based on the received data and the second command.

In still yet another example, assume that a service provider, associated with user device 110-4, allows using user device 110-4 to record only two different television shows at one time. Further assume that user 510 operates user device 110-4 to enter request(s) for user device 110-4 to record a first television show and a second television show during a particular period of time. At a later point in time, assume that a different person (not shown in FIG. 5) operates user device 110-4 to enter a request for user device 110-4 to record a third television show during the particular period of time. Central device 120 may receive, by using the fifth type of communication technique, a fourth message from user device 110-4. The fourth message may indicate that a conflict exists because user device 110-4 cannot record the first television show, the second television show, and the third television show during the particular period of time. Central device 120 may determine that the fourth rule is relevant based on the fourth message.

Based on the fourth rule, central device 120 may determine that instructions from user 510 are necessary. Central device 120 may transmit, by using the first type of communication technique, a request for the instructions to user device 110-5. In response, central device 120 may receive, by using the first type of communication technique, the instructions regarding how to resolve the conflict. For example, the instructions may request for user device 110-4 to record only the first television show and the third television show during the particular period of time. Central device 120 may generate a command based on the instructions. Central device 120 may transmit, by using the fifth type of communication technique, the command to user device 110-4 that directs user device 110-4 to record only the first television show and the third television show during the particular period of time. Based on the received command, user device 110-4 may cancel the recording set for the second television show, and record only the first television show and the third television show during the particular period of time.

In the examples above, two or more of the first type of communication technique, the second type of communication technique, the third type of communication technique, the fourth type of communication technique, and/or the fifth type of communication technique may be different from one another.

As described above, user devices 110 that communicate by using different communication techniques are still able to communicate with one another via central device 120. Accordingly, for example, when a particular condition is met due to an action associated with one user device 110, central device 120 may prompt an action to be taken by another user device 110.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 3 and 4, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a central device and by using a first communication technique, a message from a first user device;
    identifying, by the central device, a profile associated with the first user device;
    identifying, by the central device, one or more relevant rules in the profile based on the message;
    identifying, by the central device and in the profile, a second user device that is designated as a primary user device of a user associated with the profile;
    determining, by the central device, that the second user device is located outside a particular location after identifying that the second user device is designated as the primary user device;
    determining, by the central device, that instructions from the user are necessary based on a relevant rule of the one or more relevant rules;
    transmitting, by the central device and by using a second communication technique, a request for the instructions from the user to the second user device based on determining that the instructions from the user are necessary and based on determining that the second user device is located outside the particular location,
        the first communication technique being different from the second communication technique;
    receiving, by the central device and by using the second communication technique, the instructions from the second user device after transmitting the request for the instructions from the user; and
    causing, by the central device, the central device, the first user device, the second user device, or a third user device to perform an action based on at least one of the relevant rule or the instructions from the user,
        the central device being different from the first user device, the second user device, and the third user device,
        the first user device being different from the second user device and the third user device, and
        the second user device being different from the third user device.

2. The method of claim 1,
    where the instructions specify that the third user device is selected by the user,
    where performing the action comprises:
        transmitting, by using a third communication technique, a command to the third user device, and
    where the third communication technique is different from at least one of the first communication technique or the second communication technique.

3. The method claim 1, where using the first communication technique comprises exchanging data via the Internet or an Intranet.

4. The method claim 1, where the second communication technique is based on at least one of:
    a WiFi mechanism,
    a Bluetooth standard,
    a radio frequency (RF) protocol, or
    a mobile telecommunication standard.

5. The method of claim 1, where the action comprises at least one of:
    storing information included in the message, or
    posting the information on a social networking account of the user associated with the profile.

6. The method of claim 1, further comprising:
    receiving, from the first user device or the second user device, a registration request;
    creating the profile based on the registration request; and
    storing the profile in the central device.

7. The method of claim 6, where the registration request comprises information associated with one or more of:
    a residence associated with the user,
        the residence being the particular location, or
    a network associated with the user.

8. The method of claim 1, further comprising:
    transmitting, to the first user device, types of social contexts;
    receiving, from the first user device, a selection of one or more of the social contexts; and
    updating the profile based on the selection of one or more of the social contexts,
        where each one of the social contexts specifies a characteristic associated with the user, a residence of the user, or a network associated with the user,
        where the residence is the particular location, and
        where the one or more relevant rules are associated with the one or more of the social contexts.

9. The method of claim 1, further comprising:
    determining possible rules based on a type of the second user device;
    transmitting, to the first user device, the possible rules,
        the possible rules including the one or more relevant rules;
    receiving, from the first user device, a selection of the one or more relevant rules from the possible rules; and
    updating the profile to include the one or more relevant rules.

10. The method of claim 1, further comprising:
    receiving a signal from the second user device,
    determining information associated with the second user device based on the signal, and updating the profile to include information associated with the second user device.

11. A central device comprising:
one or more communication interfaces used for a first communication technique, a second communication technique, and a third communication technique,
the first communication technique being different from at least one of the second communication technique or the third communication technique;
a memory to store instructions; and
a processor to execute one or more of the instructions to:
receive, by using the first communication technique, a message from a first user device,
the message specifying an action performed on the first user device,
identify a profile associated with the first user device,
identify, in the profile, a relevant rule based on the action performed on the first user device and specified in the message,
identify, in the profile, a second user device that is designated as a primary user device of a user associated with the profile,
determine than another primary user device of the user is located inside a particular location,
transmit, by using the second communication technique and to the second user device, a request for user instructions from the user based on the relevant rule and based on determining that the other primary user device is located inside the particular location,
receive, by using the second communication technique, the user instructions from the second user device,
the user instructions including information identifying a third user device, and
transmit, by using the third communication technique and based on the relevant rule, a command that directs the third user device to perform a particular action associated with the relevant rule or the user instructions.

12. The central device of claim 11, where the processor is further to:
determine a format for the command based on information, in the profile, associated with the third user device, and
generate the command based on the relevant rule and the determined format.

13. The central device of claim 11, where a first type of the first user device is different from a second type of the second user device and a third type of the third user device.

14. The central device of claim 11,
where the action comprises receiving a request to output a file, and
where the request for the user instructions comprises a request for the user to select one of the first user device, the second user device, or the third user device to output content associated with the file.

15. One or more non-transitory computer-readable media storing instructions, the instructions comprising:
one or more instructions that, when executed by one or more processors of a central device, cause the one or more processors to:
receive, by using a first communication technique, a message from a first user device of a user,
identify a relevant rule based on the message and information associated with the first user device,
identify that a second user device is designated as a primary user device, of one or more primary user devices, of the user,
determine a location of the second user device after identifying that the second user device is designated as the primary user device,
transmit, by using a second communication technique and to the second user device, a request for instructions from the user based on the location of the second user device,
receive, by using the second communication technique and from the second user device, the instructions from the user,
the instructions from the user including information identifying a selection of the third user device by the user, and
the first communication technique being different from the second communication technique, and
cause the third user device to perform an action based on at least one of the relevant rule or the selection of the third user device,
the central device being different from the first user device, the second user device, and the third user device,
the first user device being different from the second user device and the third user device, and
the second user device being different from the third user device.

16. The one or more non-transitory computer-readable media of claim 15,
where the message specifies a request received by the first user device to play a file, and
where the relevant rule specifies for the central device to allow the user to select the third user device to output content associated with the file when the first user device receives the request to play the file.

17. The one or more non-transitory computer-readable media of claim 15,
where the one or more instructions to cause the third user device to perform the action comprise:
one or more instructions that, when executed by the one or more processors, cause the one or more processors to:
transmit, by using a third communication technique, a command to the third user device,
where the third communication technique is different from at least one of the first communication technique or the second communication technique, and
where the command directs the third user device to output content identified in the message.

18. The one or more non-transitory computer-readable media of claim 15,
where the relevant rule specifies for the central device to store a particular type of information when the message, from the first user device, includes the particular type of information, and
where the particular type of information comprises at least one of:
a location of the first user device,
an action performed by the first user device, or
particular information associated with content playing on the first user device.

19. The one or more non-transitory computer-readable media of claim 18,
where the one or more instructions to cause the third user device to perform the action comprise:
one or more instructions that, when executed by the one or more processors, cause the one or more processors to:

store the particular type of information when the message includes the particular type of information, receive, by using a third communication technique, a request for the particular type of information from the third user device, and transmit, by using the third communication technique, the particular type of information to the third user device, and where the third communication technique is different from at least one of the first communication technique or the second communication technique.

20. The central device of claim 11, where the processor is further to:

determine possible rules based on a type of the first user device;

transmit, to the second user device, information identifying the possible rules;

receive, from the second user device, a selection of the relevant rule from the possible rules; and update the profile to include the relevant rule.

\* \* \* \* \*